US012080198B2

(12) United States Patent
Yamada et al.

(10) Patent No.: US 12,080,198 B2
(45) Date of Patent: Sep. 3, 2024

(54) INFORMATION DISPLAY APPARATUS, METHOD FOR CONTROLLING INFORMATION DISPLAY APPARATUS, AND INFORMATION PROCESSING APPARATUS

(71) Applicant: Sony Group Corporation, Tokyo (JP)

(72) Inventors: Satoshi Yamada, Chiba (JP); Daisuke Miki, Tokyo (JP)

(73) Assignee: Sony Group Corporation (JP)

( * ) Notice: Subject to any disclaimer, the term of this patent is extended or adjusted under 35 U.S.C. 154(b) by 202 days.

(21) Appl. No.: 17/799,370

(22) PCT Filed: Feb. 24, 2021

(86) PCT No.: PCT/JP2021/006814
§ 371 (c)(1),
(2) Date: Aug. 12, 2022

(87) PCT Pub. No.: WO2021/177096
PCT Pub. Date: Sep. 10, 2021

(65) Prior Publication Data
US 2023/0055625 A1 Feb. 23, 2023

(30) Foreign Application Priority Data

Mar. 4, 2020 (JP) .................................. 2020-037189

(51) Int. Cl.
*G09F 9/30* (2006.01)
*F16M 11/04* (2006.01)
(Continued)

(52) U.S. Cl.
CPC ........... *G09F 9/301* (2013.01); *F16M 11/046* (2013.01); *F16M 11/18* (2013.01); *G01L 5/107* (2013.01); *G01P 15/08* (2013.01); *G06F 1/1694* (2013.01)

(58) Field of Classification Search
None
See application file for complete search history.

(56) References Cited

U.S. PATENT DOCUMENTS

| 2014/0029017 A1* | 1/2014 | Lee .................. G06F 1/1652 356/601 |
| 2015/0116507 A1 | 4/2015 | Sagerian et al. |
| 2022/0180779 A1* | 6/2022 | Yamamoto ........... H10K 77/111 |

FOREIGN PATENT DOCUMENTS

| CN | 203673783 U | 6/2014 |
| CN | 109027570 A | 12/2018 |

(Continued)

OTHER PUBLICATIONS

International Search Report for International Application No. PCT/JP2021/006814 mailed May 18, 2021, pp. 1-4.

*Primary Examiner* — Stephen T. Reed
(74) *Attorney, Agent, or Firm* — Lerner David LLP

(57) ABSTRACT

The information display apparatus includes a sheet display section; a mechanical mechanism that moves the display section, and switches a state of the display section between a deployment state in which a display space is formed and a non-deployment state in which the display space is not formed; a motion sensor that detects a motion of the display section; and a controller that calculates, from data of the detection performed by the motion sensor, at least motion information other than a component related to the movement of the display section that is performed by the mechanical mechanism, and determines an anomaly.

13 Claims, 8 Drawing Sheets

(51) Int. Cl.
*F16M 11/18* (2006.01)
*G01L 5/107* (2020.01)
*G01P 15/08* (2006.01)
*G06F 1/16* (2006.01)

(56) References Cited

FOREIGN PATENT DOCUMENTS

| | | |
|---|---|---|
| CN | 110716383 A | 1/2020 |
| JP | H11224138 A | 8/1999 |
| JP | 2001354074 A | 12/2001 |
| JP | 2003025004 A | 1/2003 |
| JP | 2009290504 A | 12/2009 |
| JP | 2010199672 A | 9/2010 |
| JP | 2013520090 A | 5/2013 |
| WO | WO-2019111576 A1 | 6/2019 |

\* cited by examiner

|  | Anomaly detection bit | | Motor operation bit | | Panel-power -source bit |
|---|---|---|---|---|---|
| Previous value | 0/1 | 0/1 | 0/1 | 0/1 | 0/1 |
| Current value | 0/1 | 0/1 | 0/1 | 0/1 | 0/1 |

FIG.3

INFORMATION DISPLAY APPARATUS, METHOD FOR CONTROLLING INFORMATION DISPLAY APPARATUS, AND INFORMATION PROCESSING APPARATUS

CROSS-REFERENCE TO RELATED APPLICATIONS

This application is a national phase entry under 35 U.S.C. § 371 of International Application No. PCT/JP2021/006814 filed Feb. 24, 2021, which claims the priority from Japanese Patent Application No. 2020-037189 filed in the Japanese Patent Office on Mar. 4, 2020, the entire contents of which are hereby incorporated by reference.

TECHNICAL FIELD

The present technology relates to, for example, an information display apparatus that includes a flexible rollable display, a method for controlling the information display apparatus, and an information processing apparatus.

BACKGROUND ART

The mainstream of an information display apparatus that includes a flexible rollable sheet display has a structure in which the display is deployed only in operation, for example, in order to protect the flexible display. For example, Patent Literature 1 discloses a rollable display in which, when the display is not completely taken up after a specified period of time has elapsed since the take-up was started, the take-up is stopped and a power-saving mode is started to prevent the display from being broken.

CITATION LIST

Patent Literature

Patent Literature 1: Japanese Patent Application Laid-open No. 2003-25004 (paragraph [0050])

DISCLOSURE OF INVENTION

Technical Problem

However, a flexible rollable sheet display section may be used in the environment in which the display section is constantly exposed to danger of a breakage accident such as being hit by the wind, or being greatly deformed or subjected to the impact due to, for example, being brought into contact with an obstacle. A breakage prevention technology used to cope with, for example, such a case has not been sufficient in the past.

In view of the circumstances described above, it is an object of the present technology to provide an information display apparatus that makes it possible to avoid occurrence of a breakage accident and can be safely used outdoors, a method for controlling the information display apparatus, and an information processing apparatus.

Solution to Problem

In order to solve the issues described above, an information display apparatus according to the present technology includes a sheet display section; a mechanical mechanism that moves the display section, and switches a state of the display section between a deployment state in which a display space is formed and a non-deployment state in which the display space is not formed; a motion sensor that detects a motion of the display section; and a controller that calculates, from data of the detection performed by the motion sensor, at least motion information other than a component related to the movement of the display section that is performed by the mechanical mechanism, and determines an anomaly.

The information display apparatus according to the present technology has such a configuration, and this makes it possible to detect, in real time, a state that may cause a breakage of the display section. This results in being able to effectively avoid causing damage to the information display apparatus, and thus to prolong the life of the information display apparatus.

The sheet display section may be plastically deformable, and the mechanical mechanism may be configured to take up the display section from a side of an end of the display section, and to move the display section.

The controller may be configured to stop the movement of the display section that is performed by the mechanical mechanism when the controller determines the anomaly during the movement of the display section that is performed by the mechanical mechanism.

The motion sensor may be a sensor that detects at least one of acceleration or an angular velocity.

Further, the controller may be configured to control sensitivity of the motion sensor according to an operation state of the mechanical mechanism.

The controller may be configured to set the sensitivity of the motion sensor to be lower during the movement of the display section that is performed by the mechanical mechanism than when the display section is not being moved.

The controller may be configured to determine the anomaly with respect to data obtained by removing a component of a frequency of oscillation of the mechanical mechanism from the data of the detection performed by the motion sensor.

Alternatively, the controller may be configured to stop determining the anomaly when the movement of the display section that is performed by the mechanical mechanism is started and to stop determining the anomaly when the movement of the display section that is performed by the mechanical mechanism is stopped.

Further, the controller may be configured to turn the display section off when the controller determines the anomaly in a state in which the display section is on.

The controller may be configured to determine the anomaly when the display section is in the deployment state and when the controller detects an external tension force exerted in a direction in which the display section is moved such that the state of the display section is shifted from the non-deployment state to the deployment state. For example, the controller may be configured to detect the tension force on the basis of an amount of reverse rotation of a motor of the mechanical mechanism.

A method for controlling an information display apparatus according to the present technology is a method for controlling an information display apparatus that is capable of moving a sheet display section and of switching a state of the display section between a deployment state in which a display space is formed and a non-deployment state in which the display space is not formed, the method including: detecting, by a motion sensor, a motion of the display section; calculating, from data of the detection performed by the motion sensor, at least motion information other than a component related to the movement of the display section that is performed by the mechanical mechanism; and determining an anomaly.

An information processing apparatus according to the present technology includes a controller that acquires data of detection performed by a motion sensor from an information display apparatus that includes a sheet display section; a mechanical mechanism that moves the display section, and switches a state of the display section between a deployment state in which a display space is formed and a non-deployment state in which the display space is not formed; and the motion sensor detecting a motion of the display section, the controller calculating, from the acquired detection data, at least motion information other than a component related to the movement of the display section that is performed by the mechanical mechanism, and determining an anomaly.

BRIEF DESCRIPTION OF DRAWINGS

FIG. 3 illustrates a configuration of a status storage 23 that manages the respective statuses of the information display apparatus 1 using bit information.

MODE(S) FOR CARRYING OUT THE INVENTION

Embodiments of the present technology will now be described below on the basis of the drawings.

First Embodiment

Figure 1:
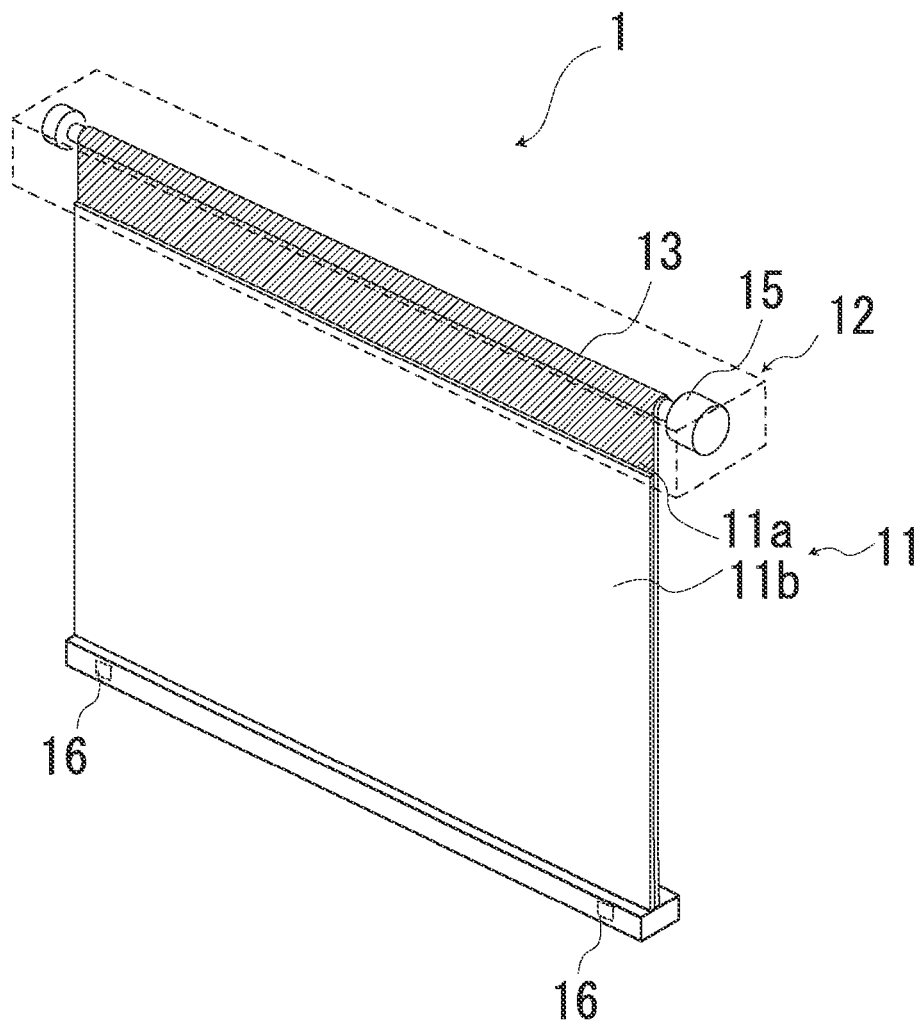
FIG. 1 is an appearance perspective view illustrating a configuration of an information display apparatus 1 of a first embodiment according to the present technology.

FIG. 1 is an appearance perspective view illustrating a configuration of an information display apparatus 1 of a first embodiment according to the present technology.

[Overall Configuration]

As illustrated in the figure, the information display apparatus 1 includes a plastically deformable sheet display section 11. An end of the display section 11 is locked into a roller section 13 of a roll-up mechanism 12 that is a mechanical mechanism. For example, when the display section 11 has a rectangle shape, a side of the rectangle shape is locked into the roller section 13 of the roll-up mechanism 12. In the present embodiment, the sheet display section 11 is upwardly rolled up by the roll-up mechanism 12. Accordingly, the display section 11 is supported in a state of being hung from the roller section 13 of the roll-up mechanism 12.

The sheet display section 11 hung from the roller section 13 of the roll-up mechanism 12 by an upper end of the display section 11 being locked into the roller section 13 can be moved between a state of being taken up by the roller section 13 and a state of being pulled out of the roller section 13. Here, the display section 11 in a state of being pulled out of the roller section 13 forms a space for displaying information. Thus, this state corresponds to a "deployment state" according to an embodiment of the present technology, and a state in which the display section 11 is taken up by the roller section 13 and the space for displaying information is not formed corresponds to a "non-deployment state" according to the embodiment of the present technology.

In a state in which the information display apparatus 1 is in operation, that is, in the deployment state of the display section 11, a weight member 14 is attached to a lower portion of the display section 11 in order to downwardly appropriately tension the sheet display section 11 pulled out of the roller section 13 to remove bending of a display screen. More specifically, a display sheet 11b that includes a display element is superimposed on one of surfaces of a support sheet 11a of a dark color such as black, and is bonded to the support sheet 11a. Accordingly, the sheet display section 11 is formed. The sheet display section 11 is supported by one of ends of the support sheet 11a being attached to the roller section 13 of the roll-up mechanism 12.

The roll-up mechanism 12 includes, for example, the roller section 13, a motor 15 that drives the roller section 13, and a roller drive mechanism (not illustrated) including, for example, a transmission gear. For example, the roll-up mechanism 12 is attached to another heavy construction such as a building through an attachment frame (not illustrated).

A motion sensor 16 that detects a motion of the display section 11 that is other than a motion that occurs due to the display section 11 being rolled up by the roll-up mechanism 12, is arranged in the information display apparatus 1. For example, an acceleration sensor and a gyroscope are used as the motion sensors 16. These sensors detect an unexpected motion, such as swing or oscillation of the display section 11, that occurs due to external force. For example, the display section 11 in operation can move in various directions at various speeds due to wind or collision of an obstacle. When such an unexpected motion of the display section 11 is repeated, the display section 11 itself or a support connection portion of the display section 11 is subjected to stress. Consequently, there is an increase in the probability of suffering damage such as deformation or a breakage, and this may result in significantly shortening the life.

In the information display apparatus 1 of the present embodiment, motion information other than a component of a steady oscillation of the display section 11 is calculated from detection data of the display section 11 that is detected by the motion sensor 16, and an anomaly is determined on the basis of the motion information. When an anomalous motion is determined, control is performed to avoid causing damage to the information display apparatus 1.

[Regarding Functional Configuration of Information Display Apparatus 1]

Figure 2:
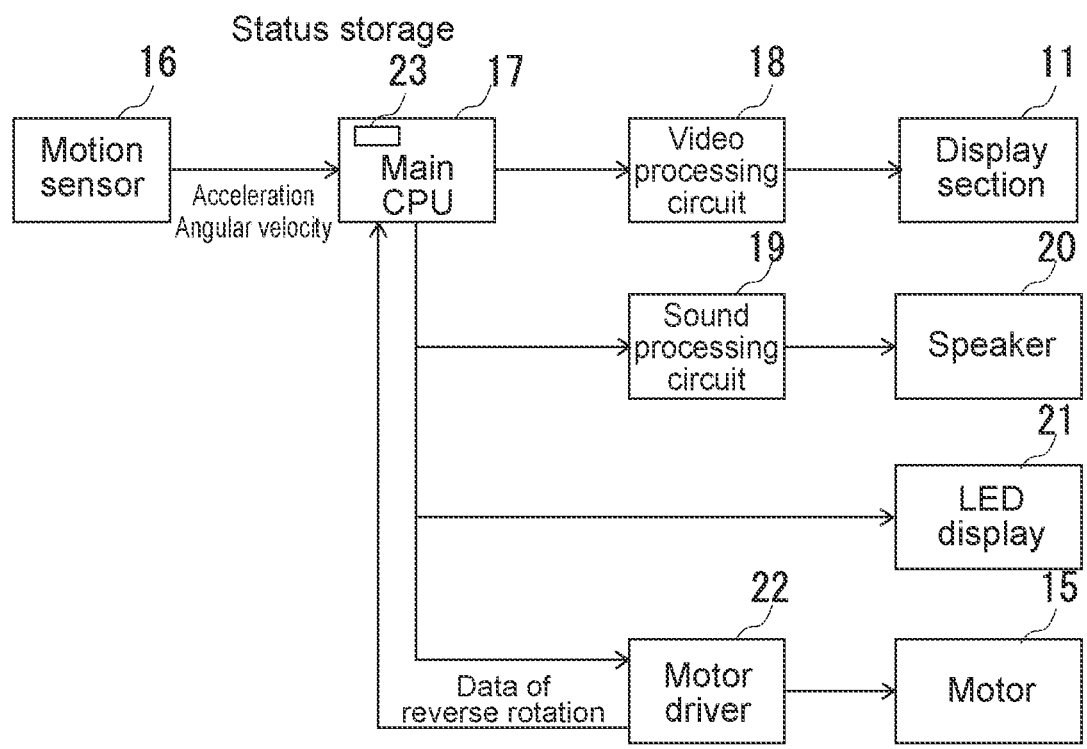
FIG. 2 is a block diagram illustrating a functional configuration of the information display apparatus 1 of the present embodiment.

FIG. 2 is a block diagram illustrating a functional configuration of the information display apparatus 1 of the present embodiment.

As illustrated in the figure, the information display apparatus 1 includes, for example, the motion sensor 16, a main central processing unit (CPU) 17, a video processing circuit 18, the display section 11, a sound processing circuit 19, a speaker 20, a light emitting diode (LED) display section 21, a motor driver 22, and the motor 15 of the roll-up mechanism 12. The main CPU 17 includes a status storage 23.

The motion sensor 16 is a sensor, such as an acceleration sensor and a gyroscope, that detects a motion of the display section 11. The motion sensor 16 is arranged in, for example, the weight member 14 provided to the lower portion of the display section 11. It is favorable that at least one motion sensor 16 be arranged at at least one location, such as in at least one weight member 14, in the display section 11.

The motor driver 22 supplies driving power to the motor 15 of the roll-up mechanism 12 on the basis of a control instruction given by the main CPU 17. Further, the motor driver 22 can convert, into a digital signal, a signal from, for example, a Hall element provided to the motor 15 and output the digital signal to the main CPU 17 as data of an amount of rotation.

The status storage 23 is a storage that holds various statuses of the information display apparatus 1. The status storage 23 includes, for example, a random access memory (RAM). The status storage 23 holds a combination of anomaly detection bits, motor operation bits, and a panel-power-source bit as a group of status bits.

FIG. 3 illustrates a configuration of the status storage 23 managing the above-described respective statuses of the information display apparatus 1 using bit information. The status storage 23 holds two groups of status bits that are a current group of status bits and a previous group of status bits. The anomaly detection bits include two bits.

"00" represents "no anomaly",
"01" represents "contact" (anomaly),
"10" represents "swing" (anomaly), and
"11" represents "tension" (anomaly).

The motor operation bits include two bits.
"00" represents "stop",
"01" represents "normal rotation", and "10" represents "reverse rotation".

The panel-power-source bit includes one bit. "0" represents "off" of a panel power source, and "1" represents "on" of the panel power source. When the panel power source is turned on, the display section 11 enters an image-display state.

The main CPU 17 performs processing on data of detection performed by the motion sensor 16 and on data of an amount of rotation from the motor driver 22, and determines whether an anomaly has occurred and the type of anomaly. When an anomaly is determined, the main CPU 17 performs control such that a safe operation is performed according to a status of the information display apparatus 1 in order to avoid causing damage to the information display apparatus 1 due to the anomaly.

The video processing circuit 18 generates image information to be displayed on the display section 11, on the basis of a display instruction given by the main CPU 17. When the main CPU 17 determines, in a state in which an image is being displayed on the display section 11 (in a state in which the panel power source is on), that an anomaly has occurred, the main CPU 17 performs control such that power supply to the display section 11 is turned off. Consequently, the display section 11 is electrically disconnected, and this makes it possible to avoid causing a more serious accident such as a short-circuiting accident in case that the display section 11 is broken due to external impact.

The sound processing circuit 19 generates a sound signal to be output to the speaker 20, on the basis of a sound instruction given by the main CPU 17. When the main CPU 17 determines an anomaly, the main CPU 17 controls the sound processing circuit 19 such that a sound message indicating occurrence of the anomaly is output.

The LED display section 21 presents occurrence of an anomaly by light emission of an LED. When the main CPU 17 determines an anomaly, the main CPU 17 controls the LED display section 21 such that occurrence of the anomaly is reported.

[Flow of Processing]

Next, a flow of processing performed by the information display apparatus 1 of the present embodiment is described.

Figure 4:
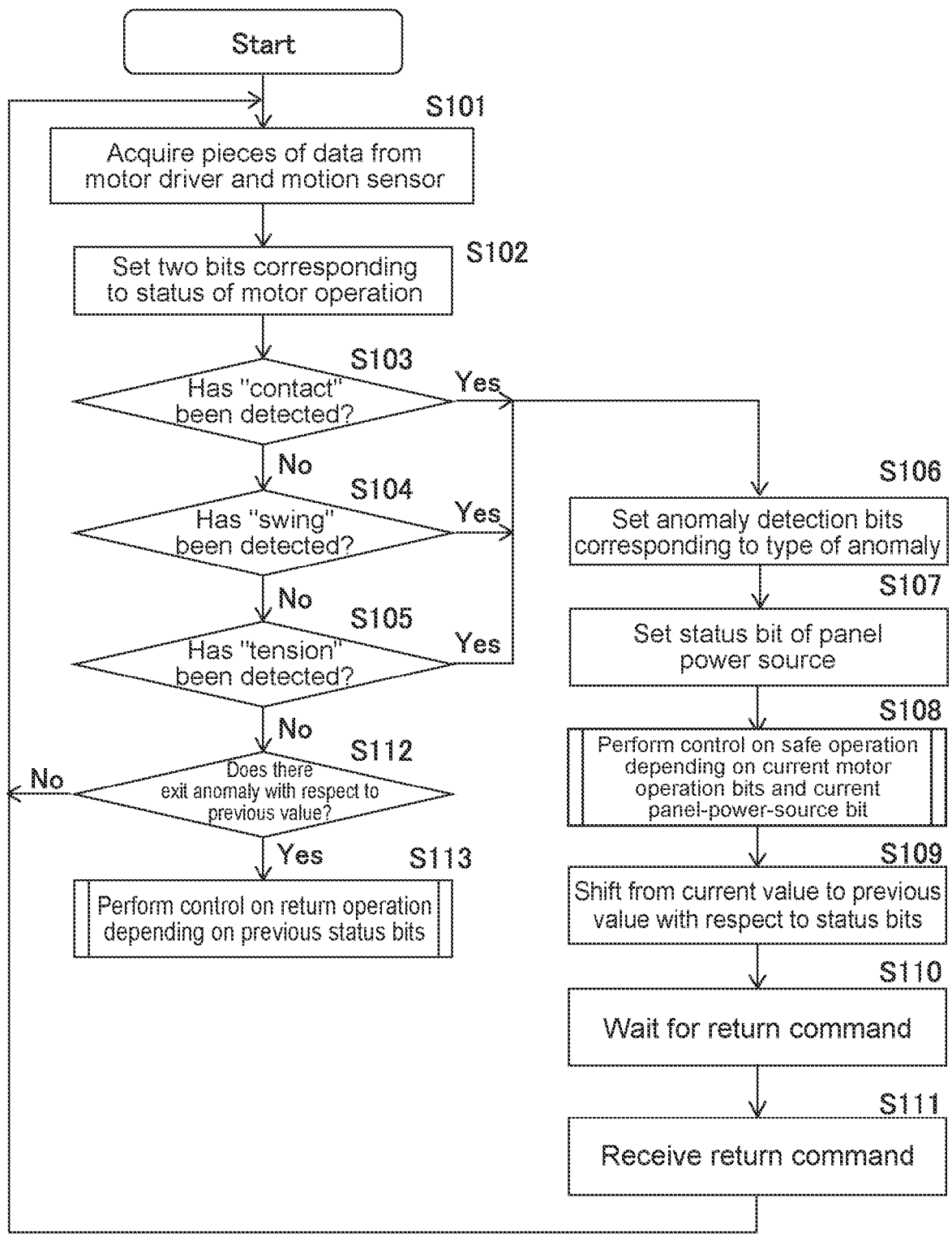
FIG. 4 is a flowchart illustrating a flow of control performed by the information display apparatus 1 of the present embodiment.

FIG. 4 is a flowchart illustrating a flow of control performed by the information display apparatus 1 of the present embodiment.

When the display section 11 is in the deployment state in which the display section 11 is pulled out to form a display space, the main CPU 17 acquires data of detection performed by the motion sensor 16, and data of an amount of rotation from the motor driver 22 (Step S101).

Note that, in this example, an acceleration sensor and a gyroscope are assumed to be used as the motion sensor 16.

The main CPU 17 determines a status of a motor operation (stop/normal rotation/reverse rotation) on the basis of the data of an amount of rotation from the motor driver 22, and sets, in the status storage 23, two bits corresponding to the status of the motor operation (Step 102).

Subsequently, the main CPU 17 calculates acceleration and an angular velocity from the data of detection performed by the motion sensor 16, and determines, from a result of the calculations, whether an anomaly has occurred and the type of anomaly (contact/swing/tension) (Steps S103 to S105).

[Anomaly Determination Based on Acceleration and Angular Velocity]

Figure 5:
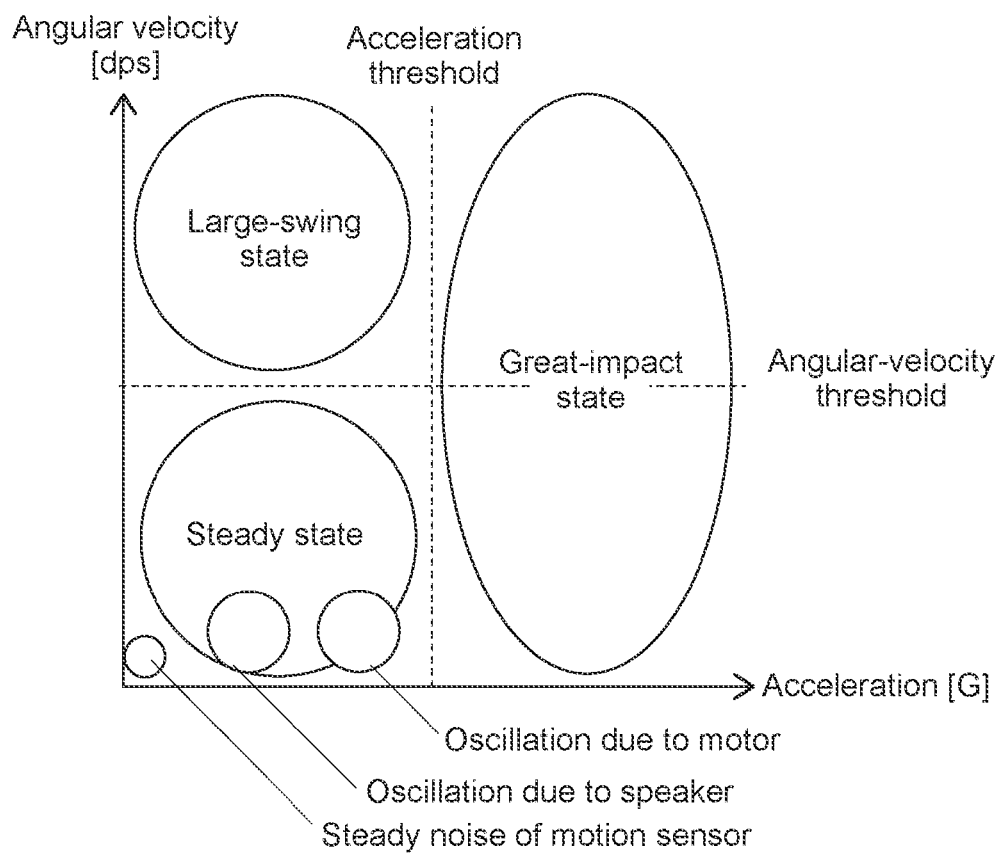
FIG. 5 is a diagram used to describe a method for determining an anomaly on the basis of acceleration and an angular velocity.

FIG. 5 is a diagram used to describe a method for determining an anomaly on the basis of acceleration and an angular velocity.

The figure is a graph in which properties of various oscillations are mapped to a space, where a horizontal axis represents acceleration, and a vertical axis represents an angular velocity.

Examples of an oscillation that occurs in the information display apparatus 1 include a steady oscillation due to, for example, an operation of rolling up the display section 11 that is performed by the roll-up mechanism 12 or due to the speaker 20; and unexpected oscillations such as an oscillation that occurs due to, for example, wind and of which a swing width is relatively large, and an oscillation that occurs due to a relatively great impact caused by, for example, being brought into contact with an external obstacle.

In the present embodiment, an angular-velocity threshold used to detect an oscillation of a large swing width, and an acceleration threshold used to detect a large impact are set in advance. With respect to an angular velocity and acceleration that are output by the motion sensor 16, the main CPU 17 determines a magnitude relationship between the angular velocity and the corresponding threshold, and a magnitude relationship between the acceleration and the corresponding threshold (Steps S103 and S104). When it has been determined, as a result of the determinations of the magnitude relationships, that the angular velocity and the acceleration do not reach their respective thresholds, the main CPU 17 determines that there is no anomaly, and repeats the comparison of subsequently acquired pieces of detection data to the respective thresholds. Further, when at least one of the acceleration or the angular velocity reaches the corresponding threshold, it is determined that "there is an anomaly". As the determined anomalies, there are an anomaly due to "contact" indicating that the acceleration exceeds the corresponding threshold, and an anomaly due to "swing" indicating that the angular velocity exceeds the corresponding threshold although the acceleration does not exceed the corresponding threshold. Thus, when the main CPU 17 has determined that the acceleration exceeds the corresponding threshold, the main CPU 17 detects "contact" (Yes in Step S103), and when the main CPU 17 has determined that the angular velocity exceeds the corresponding threshold although the acceleration does not exceed the corresponding threshold, the main CPU 17 detects "swing" (Yes in Step S104).

[Anomaly Determination Based on Amount of Reverse Rotation of Motor]

During a period of time during which the display section 11 is in the deployment state, the main CPU 17 calculates an amount of reverse rotation of the motor 15 on the basis of data acquired from the motor driver 22. On the basis of the calculated amount of reverse rotation of the motor 15, the main CPU 17 determines an anomaly due to "tension" that is caused by an external tension force exerted in a direction in which the display section 11 is moved such that the state of the display section 11 is shifted from the non-deployment state to the deployment state (Step S105). This determination is performed by determining whether, for example, the calculated amount of reverse rotation of the motor 15 exceeds a predetermined threshold. When the calculated amount of reverse rotation of the motor 15 is greater than the threshold, the main CPU 17 determines an anomaly due to "tension" has occurred in the display section 11 (Yes in Step S105).

When the main CPU 17 has determined one of the anomalies due to "contact"/"swing"/"tension", the main CPU 17 sets, in the status storage 23, anomaly detection bits of two bits that correspond to the type of the anomaly (Step S106).

Next, the main CPU 17 sets, in the status storage 23, a panel-power-source bit that corresponds to a current state of the panel power source (Step 107).

Next, according to the motor operation bits and panel-power-source bit set in the status storage 23, the main CPU 17 performs control such that a safe operation of the information display apparatus 1 is performed (Step S108).

Figure 6:
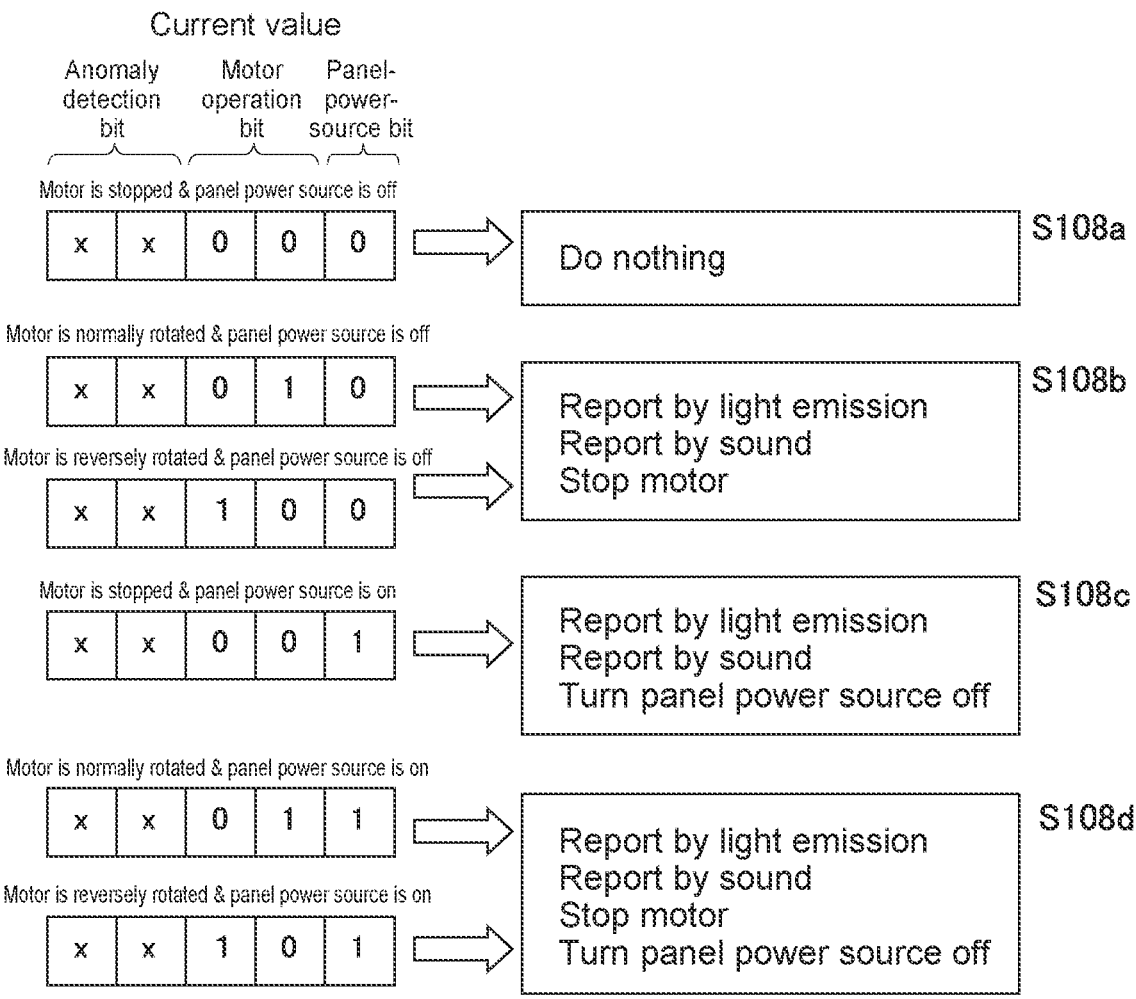
FIG. 6 illustrates control on a safe operation depending on motor operation bits and a panel-power-source bit.

FIG. 6 illustrates control on a safe operation depending on motor operation bits and a panel-power-source bit. Note that, in the figure, a value of current anomaly detection bits is represented by "x". In other words, the control on a safe operation is performed on the basis of motor operation bits and a panel-power-source bit, regardless of anomaly detection bits in the status storage 23.

As illustrated in FIG. 6, when the current motor operation bits are "00" (=stop) and when the panel-power-source bit is "0" (=off), the main CPU 17 does nothing (Step S108a).

When the motor operation bits are "01" (=normal rotation) and when the panel-power-source bit is "0" (=off), or when the motor operation bits are "10" (=reverse rotation) and when the panel-power-source bit is "0" (=off), the main CPU 17 stops a motor operation (a normal rotation or a reverse rotation) and performs control such that the LED display section 21 and the speaker 20 report occurrence of an anomaly (Step S108b).

When the motor operation bits are "00" (=stop) and when the panel-power-source bit is "1" (=on), the main CPU 17 turns the panel power source off, and performs control such that the above-described reports of occurrence of an anomaly are performed (Step S108c).

When the motor operation bits are "01" (=normal rotation) and when the panel-power-source bit is "1" (=on), or when the motor operation bits are "10" (=reverse rotation) and when the panel-power-source bit is "1" (=on), the main CPU 17 stops the motor operation, turns the panel power source off, and performs control such that the above-described reports of occurrence of an anomaly are performed (Step S108d).

Returning to FIG. 4, with respect to a current set of anomaly detection bits, motor operation bits, and a panel-power-source bit that is set in the status storage 23, the main CPU 17 shifts its value from a current value to a previous value (Step S109). Thereafter, the main CPU 17 enters a state of waiting for a return command (Step S110). In response to the return command being received, the main CPU 17 returns to Step S101, and acquires latest detection data for anomaly determination from the motion sensor 16.

When none of the anomalies due to "swing", "contact", and "tension" are determined in Steps S103 to S105 due to an anomaly being removed by the above-described control on a safe operation, the main CPU 17 performs control such that the information display apparatus 1 gets back into operation, on the basis of a set of motor operation bits and a panel-power-source bit that is set in the status storage 23 as a previous value (Step S113).

Figure 7:
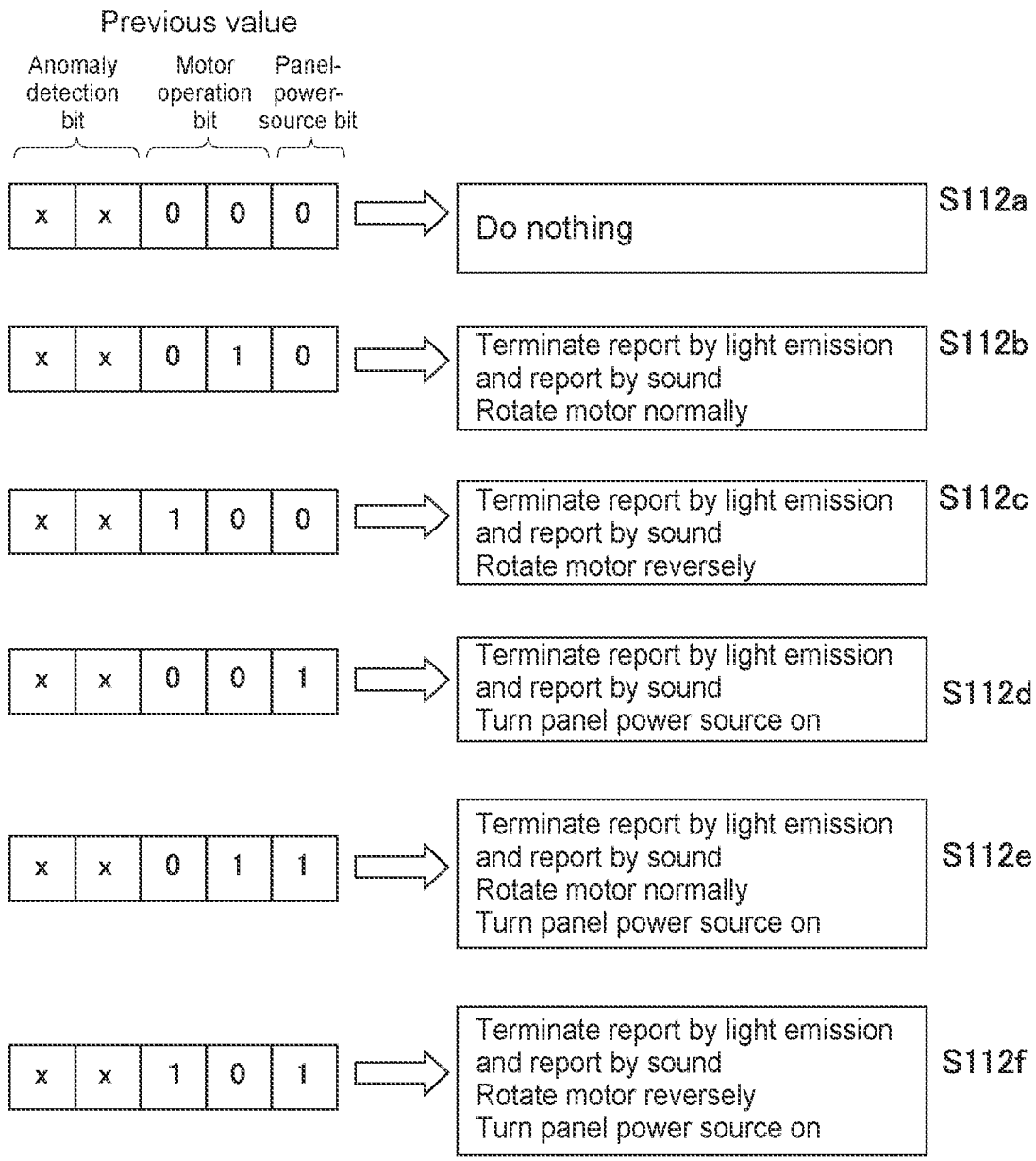
FIG. 7 is a flowchart of control performed such that the information display apparatus 1 gets back into operation.

FIG. 7 is a flowchart of control performed such that the information display apparatus 1 gets back into operation.

As illustrated in the figure, when the motor operation bits are "00" (=stop) and when the panel-power-source bit is "0" (=off), the main CPU 17 does nothing (Step S112a).

When the motor operation bits are "01" (=normal rotation) and when the panel-power-source bit is "0" (=off), the main CPU 17 terminates the above-described reports of occurrence of an anomaly, and performs control such that the motor operation of a normal rotation is restarted (Step S112b).

When the motor operation bits are "10" (=reverse rotation) and when the panel-power-source bit is "0" (=off), the main CPU 17 terminates the above-described reports of occurrence of an anomaly, and performs control such that the motor operation of a reverse rotation is restarted (Step S112c).

When the motor operation bits are "00" (=stop) and when the panel-power-source bit is "1" (=on), the main CPU 17 terminates the above-described reports of occurrence of an anomaly, and performs control such that the panel power source is turned on (Step S112d).

When the motor operation bits are "01" (=normal rotation) and when the panel-power-source bit is "1" (=on), the main CPU 17 terminates the above-described reports of occurrence of an anomaly, and performs control such that the motor operation of the normal rotation is restarted and the panel power source is turned on (Step S112e).

When the motor operation bits are "10" (=reverse rotation) and when the panel-power-source bit is "1" (=on), the main CPU 17 terminates the above-described reports of occurrence of an anomaly, and performs control such that the motor operation of the reverse rotation is restarted and the panel power source is turned on (Step S112f).

Note that, in the above-described control on a return operation, the length of a period of time for reports of occurrence of an anomaly that are performed by the LED display section 21 and the speaker 20, is determined in advance. When, upon starting control performed for getting back into operation, the reports of occurrence of an anomaly have been terminated due to the period of time for performing the reports being over, only a motor operation is restarted and a panel power source is turned on again in the control on a return operation.

[Regarding Return Command]

The following are triggers for generating a return command.

1. When one of the anomalies due to "contact", "swing", and "tension" is determined, control on a safe operation is performed, and the determined anomaly is no longer detected.
2. When a user performs a user operation such as a button input for return.
3. When a specified period of time has elapsed since an anomaly was determined.

[Norm Calculation of Evaluation Values of Acceleration and Angular Velocity]

A norm may be used to calculate evaluation values of acceleration and an angular velocity.

With respect to data of detection performed in directions of three axes of x, y, and z that is periodically acquired from the motion sensor 16, the main CPU 17 calculates a norm, and compares a value of the norm to a threshold to determine an anomaly. This makes it possible to obtain data of detection performed for any period of time without taking an initial pose of the motion sensor 16 into consideration.

[Regarding Selection of Detection Data]

Figure 8:
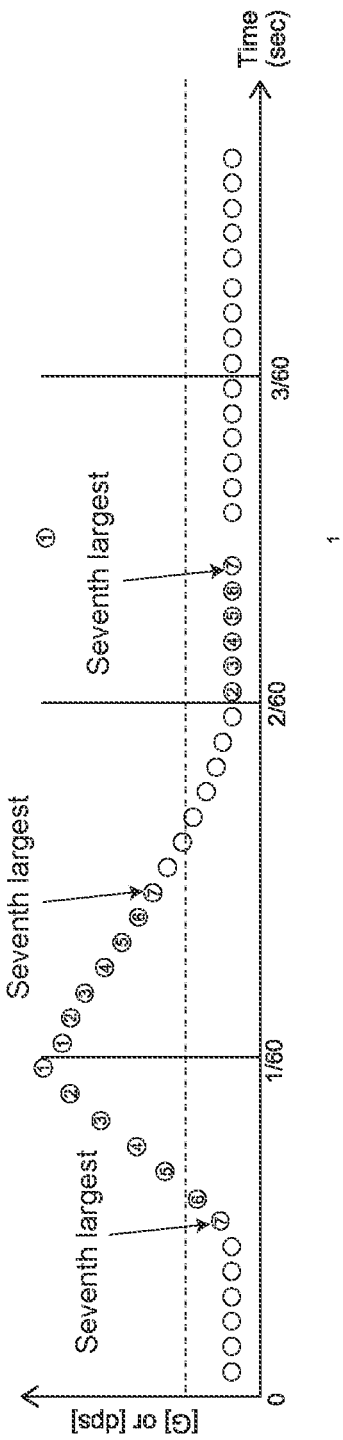
FIG. 8 is a diagram used to describe a method for selecting data of detection performed by a motion sensor 16 that is adopted in the information display apparatus 1 of the present embodiment in order to reduce an effect of noise included in the detection data.

FIG. 8 is a diagram used to describe a method for selecting data of detection performed by the motion sensor 16 that is adopted in the information display apparatus 1 of the present embodiment in order to reduce an effect of noise included in the detection data.

When, from among pieces of detection data output from the motion sensor 16 for, for example, every 1/(n*60) seconds, pieces of data output for every 1/60 seconds are adopted to calculate acceleration and an angular velocity, the main CPU 17 selects a piece of detection data of which a value is around a (n/2)-th largest value of values of the adopted pieces of data, in order to reduce an effect of noise included in output of the sensor. FIG. 8 illustrates an example in which a piece of data of a seventh largest value is selected when 14 pieces of detection data are output from the motion sensor 16 for every 1/60 seconds.

Alternatively, each average of the 14 pieces of detection data output for every 1/60 seconds may be adopted for the calculation.

[First Modification]

In the descriptions above, the main CPU 17 included in the information display apparatus 1 determines an anomaly and performs control depending on the determination of the anomaly. However, the control may be performed by a CPU of an information processing apparatus such as a server apparatus that is connected to the information display apparatus 1 through a wired or wireless network.

[Second Modification]

In the embodiments described above, the main CPU 17 constantly monitors detection output from the motion sensor 16 and the motor driver 22 to detect an anomaly. However, an anomaly may be determined on the basis of data of detection performed by the motion sensor 16, only when the motor is in operation or when the panel power source is on. This makes it possible to suppress power consumption of the information display apparatus 1.

[Third Modification]

In the embodiments described above, with respect to an angular velocity and acceleration that are output by the motion sensor 16, the main CPU 17 determines a magnitude relationship between the angular velocity and a corresponding threshold, and a magnitude relationship between the acceleration and a corresponding threshold, and determines whether there is an anomaly on the basis of a result of the determination. Here, the respective thresholds of acceleration and an angular velocity may be changed according to an operation state of the motor 15. For example, it is conceivable that, in order to reduce an effect of a component of oscillation of the motor 15, the respective thresholds of acceleration and an angular velocity could be made larger and the sensitivity of the motion sensor 16 could be made lower when the motor 15 is in operation, compared to when the motor 15 is stopped.

Further, the main CPU 17 may determine an anomaly on the basis of information obtained by removing a primary component of a frequency of oscillation of the motor 15 from data of detection performed by the motion sensor 16. This makes it possible to prevent determination of an anomaly from being adversely affected by oscillation of the motor 15, and thus to improve the accuracy.

Furthermore, upon starting the motor 15 and upon stopping the motor 15, the main CPU 17 may stop an anomaly determination performed on the basis of data of detection performed by the motion sensor 16, in order to not determine an anomaly from oscillation that occurs upon starting the motor 15 and upon stopping the motor 15. The above-described provision of a temporal dead band makes it possible to prevent determination of an anomaly from being adversely affected by oscillation that occurs upon starting the motor 15 and upon stopping the motor 15, and thus to improve the accuracy.

Note that the present technology is not limited to being applied to the information display apparatus 1 having a structure in which the display section 11 is upwardly rolled up. For example, the present technology may be applied to an information display apparatus that has a configuration in which the display section 11 is moved from side to side or back and forth.

Further, in the present technology, the display section 11 is not limited to being plastically deformable. For example, the present technology may also be applied to a configuration in which the display section 11 in the form of a plate is accommodated in a case when the display section 11 is not in operation, and is mechanically pulled out of the case when the display section 11 is in operation.

Moreover, the present technology is not limited to the embodiments described above, and of course various modifications may be made thereto without departing from the scope of the present technology.

Further, the present technology may also take the following configurations.

(1) An information display apparatus, including:
a sheet display section;
a mechanical mechanism that moves the display section, and switches a state of the display section between a deployment state in which a display space is formed and a non-deployment state in which the display space is not formed;
a motion sensor that detects a motion of the display section; and
a controller that calculates, from data of the detection performed by the motion sensor, at least motion information other than a component related to the movement of the display section that is performed by the mechanical mechanism, and determines an anomaly.

(2) The information display apparatus according to (1), in which
the sheet display section is plastically deformable, and
the mechanical mechanism is configured to take up the display section from a side of an end of the display section, and to move the display section.

(3) The information display apparatus according to (1) or (2), in which
the controller is configured to stop the movement of the display section that is performed by the mechanical mechanism when the controller determines the anomaly during the movement of the display section that is performed by the mechanical mechanism.

(4) The information display apparatus according to any one of (1) to (3), in which
the motion sensor is a sensor that detects at least one of acceleration or an angular velocity.

(5) The information display apparatus according to any one of (1) to (4), in which
the controller is configured to control sensitivity of the motion sensor according to an operation state of the mechanical mechanism.

(6) The information display apparatus according to any one of (1) to (5), in which
the controller is configured to set the sensitivity of the motion sensor to be lower during the movement of the display section that is performed by the mechanical mechanism than when the display section is not being moved.

(7) The information display apparatus according to any one of (1) to (6), in which
the controller is configured to determine the anomaly with respect to data obtained by removing a component of a frequency of oscillation of the mechanical mechanism from the data of the detection performed by the motion sensor.

(8) The information display apparatus according to any one of (1) to (7), in which
the controller is configured to stop determining the anomaly when the movement of the display section that is performed by the mechanical mechanism is started and to stop determining the anomaly when the movement of the display section that is performed by the mechanical mechanism is stopped.

(9) The information display apparatus according to any one of (1) to (8), in which
the controller is configured to turn the display section off when the controller determines the anomaly in a state in which the display section is on.

(10) The information display apparatus according to any one of (1) to (9), in which
the controller is configured to determine the anomaly when the display section is in the deployment state and when the controller detects an external tension force exerted in a direction in which the display section is moved such that the state of the display section is shifted from the non-deployment state to the deployment state.

(11) The information display apparatus according to (10), in which
the controller is configured to detect the tension force on the basis of an amount of reverse rotation of a motor of the mechanical mechanism.

(12) A method for controlling an information display apparatus that is capable of moving a sheet display section and of switching a state of the display section between a deployment state in which a display space is formed and a non-deployment state in which the display space is not formed, the method including:
detecting, by a motion sensor, a motion of the display section;
calculating, from data of the detection performed by the motion sensor, at least motion information other than a component related to the movement of the display section that is performed by the mechanical mechanism; and
determining an anomaly.

(13) The method for controlling an information display apparatus according to (12), in which
when the anomaly is determined during the movement of the display section that is performed by the mechanical mechanism, control is performed such that the movement of the display section that is performed by the mechanical mechanism is stopped.

(14) The method for controlling an information display apparatus according to (12) or (13), in which
sensitivity of the motion sensor is controlled according to an operation state of the mechanical mechanism.

(15) The method for controlling an information display apparatus according to any one of (12) to (14), in which
control is performed such that the sensitivity of the motion sensor is set to be lower during the movement of the display section that is performed by the mechanical mechanism than when the display section is not being moved.

(16) The method for controlling an information display apparatus according to any one of (12) to (15), in which
control is performed such that the anomaly is determined with respect to data obtained by removing a component of a frequency of oscillation of the mechanical mechanism from the data of the detection performed by the motion sensor.

(17) The method for controlling an information display apparatus according to any one of (12) to (16), in which
control is performed such that the determination of the anomaly is stopped when the movement of the display section that is performed by the mechanical mechanism is started and such that the determination of the anomaly is stopped when the movement of the display section that is performed by the mechanical mechanism is stopped.

(18) The method for controlling an information display apparatus according to any one of (12) to (17), in which
when the anomaly is determined in a state in which the display section is on, control is performed such that the display section is turned off.

(19) The method for controlling an information display apparatus according to any one of (12) to (18), in which
when the display section is in the deployment state and when an external tension force is detected that is exerted in a direction in which the display section is moved such that the state of the display section is shifted from the non-deployment state to the deployment state, control is performed such that the anomaly is determined.

(20) The method for controlling an information display apparatus according to (19), in which
the tension force is detected on the basis of an amount of reverse rotation of a motor of the mechanical mechanism.

(21) An information processing apparatus, including
a controller that acquires data of detection performed by a motion sensor from an information display apparatus that includes
a sheet display section,
a mechanical mechanism that moves the display section, and switches a state of the display section between a deployment state in which a display space is formed and a non-deployment state in which the display space is not formed, and the motion sensor detecting a motion of the display section, the controller calculating, from the acquired detection data, at least motion information other than a component related to the movement of the display section that is performed by the mechanical mechanism, and determining an anomaly.

(22) The information processing apparatus according to (21), in which the controller is configured to stop the movement of the display section that is performed by the mechanical mechanism when the controller determines the anomaly during the movement of the display section that is performed by the mechanical mechanism.

(23) The information processing apparatus according to (21) or (22), in which the controller is configured to control sensitivity of the motion sensor according to an operation state of the mechanical mechanism.

(24) The information processing apparatus according to any one of (21) to (23), in which the controller is configured to set the sensitivity of the motion sensor to be lower during the movement of the display section that is performed by the mechanical mechanism than when the display section is not being moved.

(25) The information processing apparatus according to any one of (21) to (24), in which the controller is configured to determine the anomaly with respect to data obtained by removing a component of a frequency of oscillation of the mechanical mechanism from the data of the detection performed by the motion sensor.

(26) The information processing apparatus according to any one of (21) to (25), in which the controller is configured to stop determining the anomaly when the movement of the display section that is performed by the mechanical mechanism is started and to stop determining the anomaly when the movement of the display section that is performed by the mechanical mechanism is stopped.

(27) The information processing apparatus according to any one of (21) to (26), in which the controller is configured to turn the display section off when the controller determines the anomaly in a state in which the display section is on.

(28) The information processing apparatus according to any one of (21) to (27), in which the controller is configured to determine the anomaly when the display section is in the deployment state and when the controller detects an external tension force exerted in a direction in which the display section is moved such that the state of the display section is shifted from the non-deployment state to the deployment state.

(29) The information processing apparatus according to (28), in which the controller is configured to detect the tension force on the basis of an amount of reverse rotation of a motor of the mechanical mechanism.

REFERENCE SIGNS LIST 1 information display apparatus
11 display section
12 roll-up mechanism
13 roller section
14 weight member
15 motor
16 motion sensor
17 main CPU
18 video processing circuit
19 sound processing circuit
20 speaker
21 LED display section
22 motor driver
23 status storage

The invention claimed is:

1. An information display apparatus, comprising:
a sheet display section;
a mechanical mechanism that moves the display section, and switches a state of the display section between a deployment state in which a display space is formed and a non-deployment state in which the display space is not formed;
a motion sensor that detects a motion of the display section; and
a controller that calculates, from data of the detection performed by the motion sensor, at least motion information other than a component related to the movement of the display section that is performed by the mechanical mechanism, and determines an anomaly.

2. The information display apparatus according to claim 1, wherein
the sheet display section is plastically deformable, and
the mechanical mechanism is configured to take up the display section from a side of an end of the display section, and to move the display section.

3. The information display apparatus according to claim 2, wherein
the controller is configured to stop the movement of the display section that is performed by the mechanical mechanism when the controller determines the anomaly during the movement of the display section that is performed by the mechanical mechanism.

4. The information display apparatus according to claim 3, wherein
the motion sensor is a sensor that detects at least one of acceleration or an angular velocity.

5. The information display apparatus according to claim 4, wherein
the controller is configured to control sensitivity of the motion sensor according to an operation state of the mechanical mechanism.

6. The information display apparatus according to claim 5, wherein
the controller is configured to set the sensitivity of the motion sensor to be lower during the movement of the display section that is performed by the mechanical mechanism than when the display section is not being moved.

7. The information display apparatus according to claim 4, wherein
the controller is configured to determine the anomaly with respect to data obtained by removing a component of a frequency of oscillation of the mechanical mechanism from the data of the detection performed by the motion sensor.

8. The information display apparatus according to claim 4, wherein
the controller is configured to stop determining the anomaly when the movement of the display section that is performed by the mechanical mechanism is started and to stop determining the anomaly when the movement of the display section that is performed by the mechanical mechanism is stopped.

9. The information display apparatus according to claim 3, wherein
the controller is configured to turn the display section off when the controller determines the anomaly in a state in which the display section is on.

10. The information display apparatus according to claim 3, wherein
the controller is configured to determine the anomaly when the display section is in the deployment state and when the controller detects an external tension force exerted in a direction in which the display section is moved such that the state of the display section is shifted from the non-deployment state to the deployment state.

11. The information display apparatus according to claim 10, wherein
the controller is configured to detect the tension force on a basis of an amount of reverse rotation of a motor of the mechanical mechanism.

12. A method for controlling an information display apparatus that is capable of moving a sheet display section and of switching a state of the display section between a deployment state in which a display space is formed and a non-deployment state in which the display space is not formed, the method comprising:

detecting, by a motion sensor, a motion of the display section;
calculating, from data of the detection performed by the motion sensor, at least motion information other than a component related to the movement of the display section that is performed by the mechanical mechanism; and
determining an anomaly.

13. An information processing apparatus, comprising
a controller that acquires data of detection performed by
a motion sensor from an information display apparatus that includes
a sheet display section,
a mechanical mechanism that moves the display section, and switches a state of the display section between a deployment state in which a display space is formed and a non-deployment state in which the display space is not formed, and
the motion sensor detecting a motion of the display section,
the controller calculating, from the acquired detection data, at least motion information other than a component related to the movement of the display section that is performed by the mechanical mechanism, and determining an anomaly.

* * * * *